US009106643B2

(12) United States Patent
Pickelhaupt et al.

(10) Patent No.: US 9,106,643 B2
(45) Date of Patent: *Aug. 11, 2015

(54) ENSEMBLE COMPUTING

(71) Applicant: FMR LLC, Boston, MA (US)

(72) Inventors: Charles Pickelhaupt, Winchester, MA (US); Dmitry Bisikalo, Framingham, MA (US)

(73) Assignee: FMR LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/455,455

(22) Filed: Aug. 8, 2014

(65) Prior Publication Data

US 2014/0351905 A1 Nov. 27, 2014

Related U.S. Application Data

(63) Continuation of application No. 14/218,363, filed on Mar. 18, 2014, now Pat. No. 8,819,127.

(60) Provisional application No. 61/811,403, filed on Apr. 12, 2013.

(51) Int. Cl.
*H04L 29/06* (2006.01)

(52) U.S. Cl.
CPC ............ *H04L 63/0823* (2013.01); *H04L 69/08* (2013.01)

(58) Field of Classification Search
CPC .. H04L 63/0823; H04L 69/08; H04L 63/0272
USPC ..................... 726/15; 709/226, 230
See application file for complete search history.

(56) References Cited

U.S. PATENT DOCUMENTS

| 7,072,898 B2 | 7/2006 | Bussler et al. |
| 7,535,872 B2 | 5/2009 | Jee et al. |
| 7,607,137 B2 | 10/2009 | Hauser et al. |
| 8,015,569 B2 | 9/2011 | Cho et al. |

(Continued)

FOREIGN PATENT DOCUMENTS

| EP | 1500286 | 6/2011 |
| EP | 1527641 | 11/2012 |

(Continued)

OTHER PUBLICATIONS

Rodeh, Ohad Birman, Ken Hayden, and Danny Mark Dolev. Dynamic virtual private networks. Cornell University, 1998.*

(Continued)

*Primary Examiner* — Syed Zaidi
(74) *Attorney, Agent, or Firm* — Proskauer Rose LLP

(57) ABSTRACT

Described herein are methods, systems, and computer program products for seamless interoperability between multiple computing nodes. A server computing device receives, from a first computing node in a plurality of computing nodes, a message for transmission to one or more other computing nodes, the message generated by the first computing node based upon application-specific instructions from a first application on the first computing node, where the plurality of computing nodes is defined as a virtual network at the server computing device and each computing node includes an ensemble module for communicating with the server. The server determines one or more other computing nodes in the virtual network to receive the message. The server transmits the message to the determined one or more other computing nodes, where each of the destination computing nodes formats the message into application-specific instructions for a second application on the determined node.

10 Claims, 5 Drawing Sheets

(56) References Cited

U.S. PATENT DOCUMENTS

| | | |
|---|---|---|
| 8,072,950 B2 | 12/2011 | Fan et al. |
| 8,181,151 B2 | 5/2012 | Sedukhin et al. |
| 8,203,971 B2 | 6/2012 | Richardson et al. |
| 8,332,538 B2 | 12/2012 | Tan et al. |
| 8,412,826 B2 | 4/2013 | Lamb et al. |
| 8,650,226 B2 | 2/2014 | Bobick et al. |
| 2002/0199007 A1* | 12/2002 | Clayton et al. ............... 709/230 |
| 2006/0143702 A1* | 6/2006 | Hisada et al. ................. 726/15 |
| 2006/0230124 A1 | 10/2006 | Belfiore et al. |
| 2007/0130342 A1* | 6/2007 | Ishida et al. ................. 709/226 |
| 2009/0103535 A1 | 4/2009 | McCoy et al. |
| 2011/0179132 A1 | 7/2011 | Mayo et al. |
| 2012/0110086 A1 | 5/2012 | Baitinger et al. |
| 2013/0185667 A1 | 7/2013 | Harper et al. |

FOREIGN PATENT DOCUMENTS

| | | |
|---|---|---|
| WO | 2012079240 | 6/2012 |
| WO | 2013008026 | 7/2012 |

OTHER PUBLICATIONS

Van Renesse, Robbert, et al. Building adaptive systems using Ensemble. Cornell University, 1997.*

Bulej et al. "Using Connectors for Deployment of Heterogeneous Applications in the Context of OMG D&C Specification," Charles University, Academy of Sciences of the Czech Republic. 12 pages.

Mao et al. "A Framework for Universal Service Access Using Device Ensemble," Computer Science Division, EECS Department, University of California at Berkeley, CA. 5 pages.

Schilit et al. "Device Ensembles," Computer, IEEE Computer Society, Dec. 2004, pp. 56-64.

Thomas et al. "Ensemble Computing," International Journal of Human-Computer Interaction, 13(2), pp. 113-121, 2001.

Want et al. "Ensemble Computing: Opportunities and Challenges," Intel Technology Journal, vol. 14, Issue 1, 2010, pp. 76-99.

Notice of Allowance from U.S. Appl. No. 14/218,363 dated Jun. 30, 2014, 10 pages.

* cited by examiner

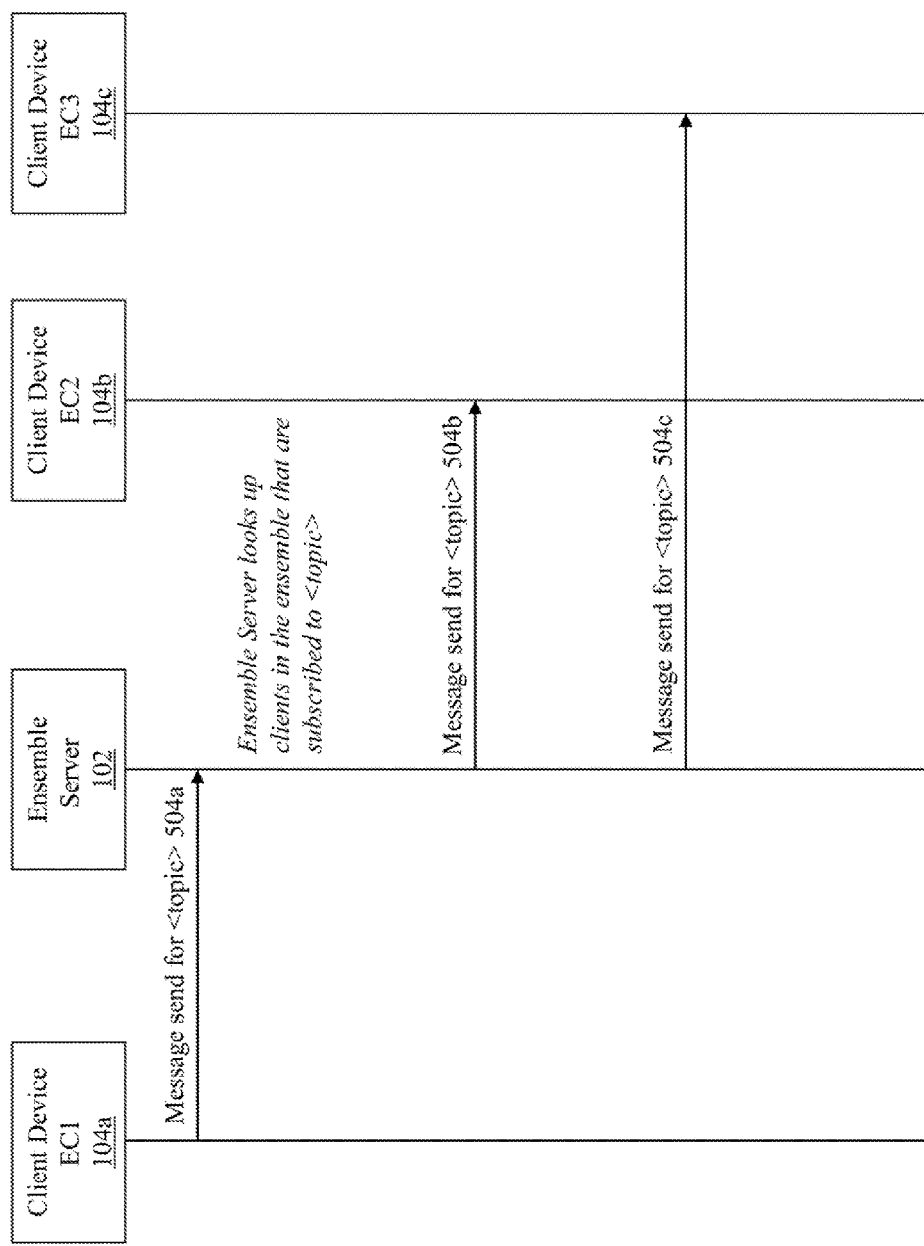

ENSEMBLE COMPUTING

RELATED APPLICATIONS

This application is a continuation of U.S. patent application Ser. No. 14/218,363, filed on Mar. 18, 2014, which claims priority to U.S. Provisional Patent Application No. 61/811,403, filed Apr. 12, 2013, the entirety of which is incorporated herein by reference.

FIELD OF THE INVENTION

This application relates generally to methods and apparatuses, including computer program products, for seamless interoperability between multiple computing devices, also called ensemble computing.

BACKGROUND

Introduction of various computing devices in everyday life has been growing and continues to grow exponentially. New form factors (e.g., smart phones, tables, digital TVs, and game consoles), new kinds of sensors (e.g., accelerometers, GPS, and proximity sensors), new low-level networks (e.g., Wi-Fi, Bluetooth, and NFC), and other technological advances are being introduced in the marketplace, as the pace of innovation continues.

These computing devices operate as individual independent nodes, and their ability to interoperate and augment each other is limited to simple, rudimentary modes of cooperation (e.g., send a picture from a smart phone to printer or display it on Digital TV). Interoperability between devices and their applications is predefined by device creators, and often serves narrow purposes.

Generally, computing systems are defined by the functionality or capabilities it can provide. Computing device makers offer basic computing platform operating system (OS) capabilities (e.g. PC, tablet, and smart phone) and open up the platform for independent vendors to extend through application and services. Various applications are able to interoperate, share data, and otherwise augment each other's capabilities. Since the PC era and into the mobile and sensor eras, OS providers have been offering application interoperability application Programming Interfaces (APIs) as part of their core operating systems. Microsoft Windows OLE, Apple OpenDoc, and Android Intents are examples of APIs and protocols provided to independent vendors to allow their applications to interoperate.

SUMMARY OF THE INVENTION

There is a need for a method and system to allow personalized, custom interoperability between different kinds of devices or systems—including devices and systems that have not been created yet—without the use of a proprietary and/or application-specific API or protocol. The methods and systems described herein relate to ensemble computing—an open system for seamless interoperability between multiple computing devices, including between heterogeneous devices. Using the techniques described herein, computing devices can be connected in a seamless network, or ensemble of capabilities. The network does not assume predefined modes of interaction between computing devices, but rather is open to extension and reconfiguration.

The invention, in one aspect, features a system for seamless interoperability between multiple computing nodes. The system includes a server computing device and a plurality of computing nodes coupled to the server computing device, where the plurality of computing nodes is defined as a virtual network at the server computing device and each computing node includes an ensemble module for communicating with the server computing device. The server computing device is configured to receive, from a first computing node not currently in the virtual network, a request to join the virtual network, the request including authentication credentials and a virtual network identifier corresponding to the virtual network. The server computing device is configured to validate the authentication credentials and assign the first computing node to the virtual network based upon the virtual network identifier. The server computing device is configured to transmit, to the first computing node, the ensemble module for execution on the first computing node.

The invention, in another aspect, features a method for seamless interoperability between multiple computing nodes. A server computing device defines a virtual network comprising a plurality of computing nodes coupled to the server computing device and each computing node including an ensemble module for communicating with the server computing device. The server computing device receives, from a first computing node not currently in the virtual network, a request to join the virtual network, the request including authentication credentials and a virtual network identifier corresponding to the virtual network. The server computing device validates the authentication credentials and assigns the first computing node to the virtual network based upon the virtual network identifier. The server computing device transmits, to the first computing node, the ensemble module for execution on the first computing node.

The invention, in another aspect, features a system for seamless interoperability between multiple computing nodes. The system includes a server computing device and a plurality of computing nodes coupled to the server computing device, where the plurality of computing nodes is defined as a virtual network at the server computing device and each computing node includes an ensemble module for communicating with the server computing device. The server computing device is configured to receive, from a computing node in the virtual network, a request to subscribe to a message topic, assign the computing node to a subscription list associated with the message topic, and transmit, to each of the computing nodes on the subscription list, messages corresponding to the message topic that are received from the plurality of computing nodes in the virtual network.

The invention, in another aspect, features a method for seamless interoperability between multiple computing nodes. A server computing device defines a virtual network comprising a plurality of computing nodes coupled to the server computing device and each computing node including an ensemble module for communicating with the server computing device. The server computing device receives, from a computing node in the virtual network, a request to subscribe to a message topic, assigns the computing node to a subscription list associated with the message topic, and transmits, to each of the computing nodes on the subscription list, messages corresponding to the message topic that are received from the plurality of computing nodes in the virtual network.

The invention, in another aspect, features a system for seamless interoperability between multiple computing nodes. The system includes a server computing device and a plurality of computing nodes coupled to the server computing device, where the plurality of computing nodes is defined as a virtual network at the server computing device and each computing node includes an ensemble module for communicating with the server computing device. The server computing device is configured to receive, from a first computing node, a message for transmission to one or more other computing nodes in the virtual network, the message generated by the first computing node based upon application-specific instructions from a first application on the first computing node. The server computing device is configured to determine one or more other computing nodes in the virtual network to receive the message and transmit the message to the determined one or more other computing nodes, where each of the destination computing nodes formats the message into application-specific instructions for a second application on the determined node. If at least one of the determined one or more other computing nodes is offline, the server computing device stores the message locally until the offline computing nodes reconnect to the server computing device.

The invention, in another aspect, features a method for seamless interoperability between multiple computing nodes. A server computing device receives, from a first computing node in a plurality of computing nodes coupled to the server computing device, a message for transmission to one or more other computing nodes, the message generated by the first computing node based upon application-specific instructions from a first application on the first computing node, where the plurality of computing nodes is defined as a virtual network at the server computing device and each computing node includes an ensemble module for communicating with the server computing device. The server computing device determines one or more other computing nodes in the virtual network to receive the message and transmits the message to the determined one or more other computing nodes, where each of the determined computing nodes formats the message into application-specific instructions for a second application on the determined node. If at least one of the determined one or more other computing nodes is offline, the server computing device stores the message locally until the offline computing nodes reconnect to the server computing device.

Any of the above aspects can include one or more of the following features. In some embodiments, the first computing node transmits the request to join the virtual network to the server computing device based upon an invitation received from the server computing device. In some embodiments, the invitation is received from one of the plurality of computing nodes in the virtual network. In some embodiments, the first computing node is removed from the virtual network after a predetermined period of time. In some embodiments, the first computing node is removed from the virtual network upon request of one of the other computing nodes in the virtual network. In some embodiments, the message topic relates to an application function. In some embodiments, the message topic relates to a business process.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 is a flow diagram of a method for exchanging messages between devices in an ensemble computing system.

DETAILED DESCRIPTION

Figure 1:
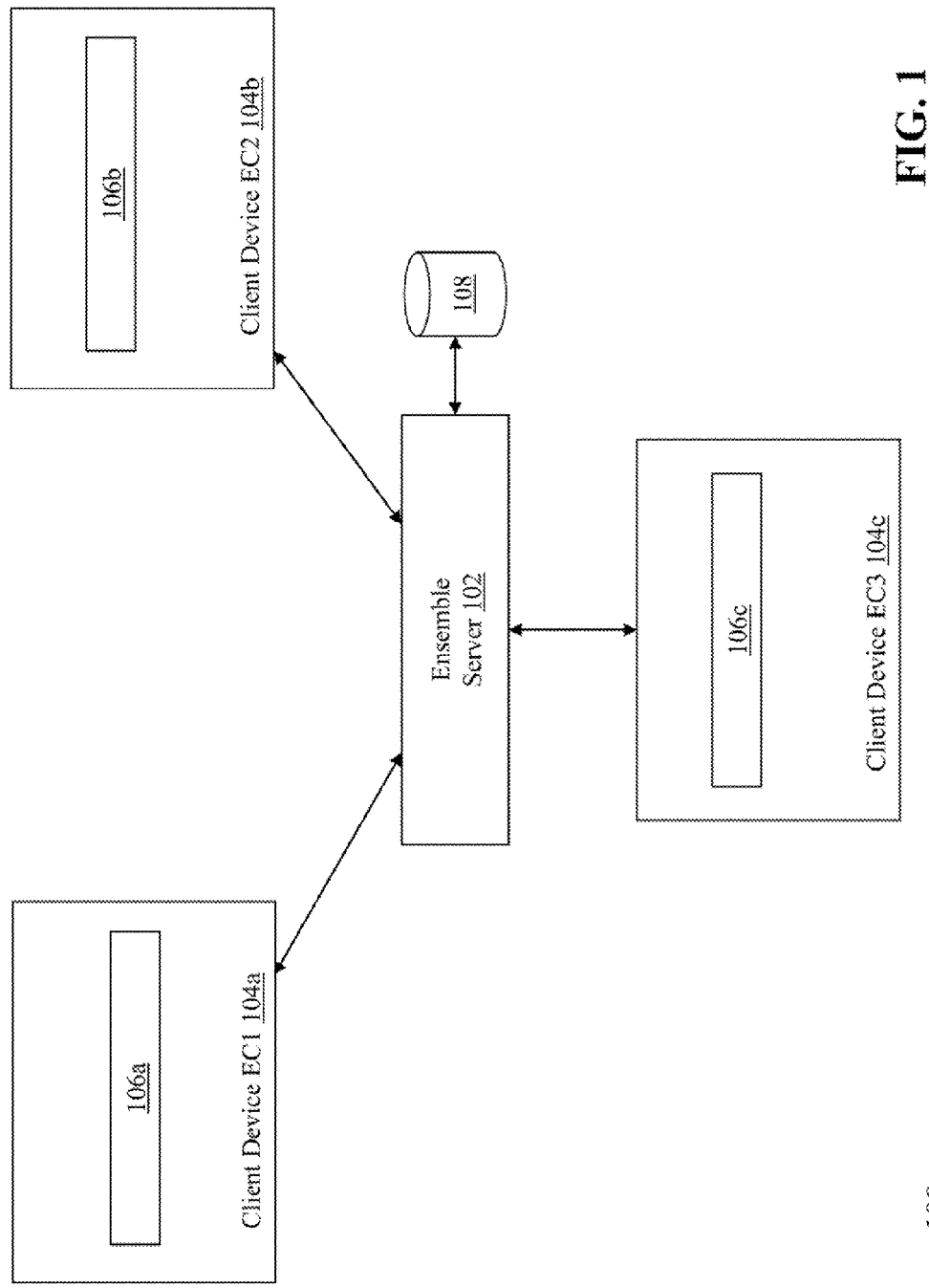
FIG. 1 is a block diagram of a system for seamless interoperability between multiple computing devices.

FIG. 1 is a block diagram of a system 100 for seamless interoperability between multiple computing devices using the techniques described herein. FIG. 1 includes an ensemble server 102 that is coupled to a plurality of client computing devices 104a-104c via a communications network. The ensemble server 102 is coupled to a database 108. The client computing devices 104a-104c in FIG. 1, and the applications running on the devices 104a-104c, collectively make up an ensemble. Each of the client computing devices 104a-104c includes an ensemble module 106a-106c that operates to transmit outbound ensemble messages to the ensemble server 102 received from applications executing on the respective devices, and to receive inbound ensemble messages received from the ensemble server 102 to one or more applications executing on the respective devices.

In some embodiments, the ensemble module is a library of functions (e.g., an Ensemble API) used by applications executing on a client device to transmit ensemble messages to the ensemble server 102 and receive ensemble messages from the ensemble server 102. The respective applications are configured to convert their application-specific messages into a format compatible with the ensemble system 100 using the Ensemble API. For example, application developers include logic in their applications to interact with the Ensemble API and provide ensemble-compatible messages to the Ensemble API for transmission to the ensemble server 102.

An ensemble is an application-level virtual network that consists of a number of computing applications running on devices. As used herein, it should be appreciated that the terms "device" and "application" in this context are very generic. Any computing device—a smart phone, an application on a PC, a digital TV, a sensor, even a web service in the cloud can be considered a "device," or node, in the ensemble.

Devices (e.g., client devices 104a-104c) in the ensemble system 100 can be heterogeneous, that is, the devices do not have to be produced by the same vendor, run the same OS, or support any common interoperability framework. The system 100 is completely open for inclusion of any kind to device into the ensemble. Any software, firmware, hardware, or other execution commands running on such a device is considered an "application" in this context.

Devices are gathered or included into an ensemble to provide greater user experience than they can provide individually. By being greater than the sum of its parts, a computing ensemble is designed to offer its owner new capabilities through seamless integration and interoperation of individual components. Ensemble "owner" in this context is not tied to possession of devices or applications (i.e., all devices owned by an individual), but rather to the purpose of assembling devices, applications, or nodes in the ensemble. For instance, a simple example of an ensemble can include all devices owned by an individual, but another kind of ensemble can be comprised of a particular application used by a group of people or organization. The ensemble owner has the ability to include or exclude nodes in an ensemble. An individual can own and/or participate in multiple ensembles, depending on each ensemble's purpose. Ensembles can also own other ensembles, as required.

As described above, an ensemble member can be a computing device's operating system, a software application, a web service, or the like. Ensemble members interact with an Ensemble API provided by an Ensemble Infrastructure (defined below) to join or leave the ensemble and to register and send/receive ensemble-wide messages.

Ensemble management tasks include creating ensembles through the Ensemble API, selecting and inviting individual nodes to join, and disconnecting of individual nodes. Ensemble management is performed by (or on behalf of) an ensemble owner. Lifetimes of ensembles may vary based on their purpose. For example, ensembles can be long-lived and tied to a possession of a number of physical devices. In another example, ensembles can be situational and be created for a short term-purpose (e.g., two individuals connect their smart phones in a two-device ensemble to exchange addresses or execute a legal agreement). These situational ensembles can be broken as soon as the need for them no longer exists. Some ensembles can be temporal (e.g., an open Ensemble for a conference feedback gathering, created for the duration of the conference). Ensembles can be private (i.e., ensemble owner is in full control of the membership), shared (i.e., open for some nodes to join, depending on specified criteria), or open.

An Ensemble Infrastructure can have multiple implementations but is accessible through the Ensemble APIs. Responsibilities of an Ensemble Infrastructure include:

Ability to create ensembles (e.g., a named networks of nodes);

Ability to manage nodes in an ensemble (e.g., include/exclude/invite nodes);

Ability to maintain information about the current members of an ensemble;

Ability to deliver/broadcast messages to the current members of an ensemble; and Ability to queue/save messages for members that are temporarily unreachable.

In some embodiments, ensemble computing is a distributed asynchronous messaging broadcast system. Unlike other interoperability frameworks, an ensemble (e.g., ensemble system 100) is not confined to a single device or a specific type of OS. Nodes in the ensemble are not tied to physical devices, but can reside in any networked computing medium, either co-located or separated by physical distance. Once collected in the ensemble, the nodes represent a virtual messaging network to produce and consume messages of any kind Each individual node can register its interest in specific kinds of messages (also called topics). Any node can send a message through the Ensemble APIs, and the Ensemble Infrastructure takes care of delivering those messages to interested nodes.

The ensemble messages represent broad types of application-agnostic functions. In some embodiments, message types can include authenticate, register, unregister, send/broadcast, receive/listen. The individual nodes that interact with the ensemble server 102 via the Ensemble API are required to interpret and convert the ensemble messages into a format that is compatible with the individual nodes. The ensemble server 102 and ensemble modules 106a-106c do not perform any message definition, interpretation, translation or analysis.

For example, a financial application executing on client device 104a and a display device driver executing on client device 104b are both registered with the ensemble server 102 as part of the same ensemble. The financial application on device 104a wants to transmit an investment analysis chart for display using the display device driver on client device 104b.

The financial application includes logic that converts the graphical data underlying the investment analysis chart into a 'send' message defined by the Ensemble API and transmits the 'send' message to the ensemble server 102. The ensemble server 102 determines that the client device 104b is the intended recipient of the 'send' message and transmits the message to device 104b. The display device driver on device 104b receives the 'send' message via the Ensemble API and includes logic to convert the 'send' message into a compatible format in order to display the chart on an associated display device.

Figure 2:
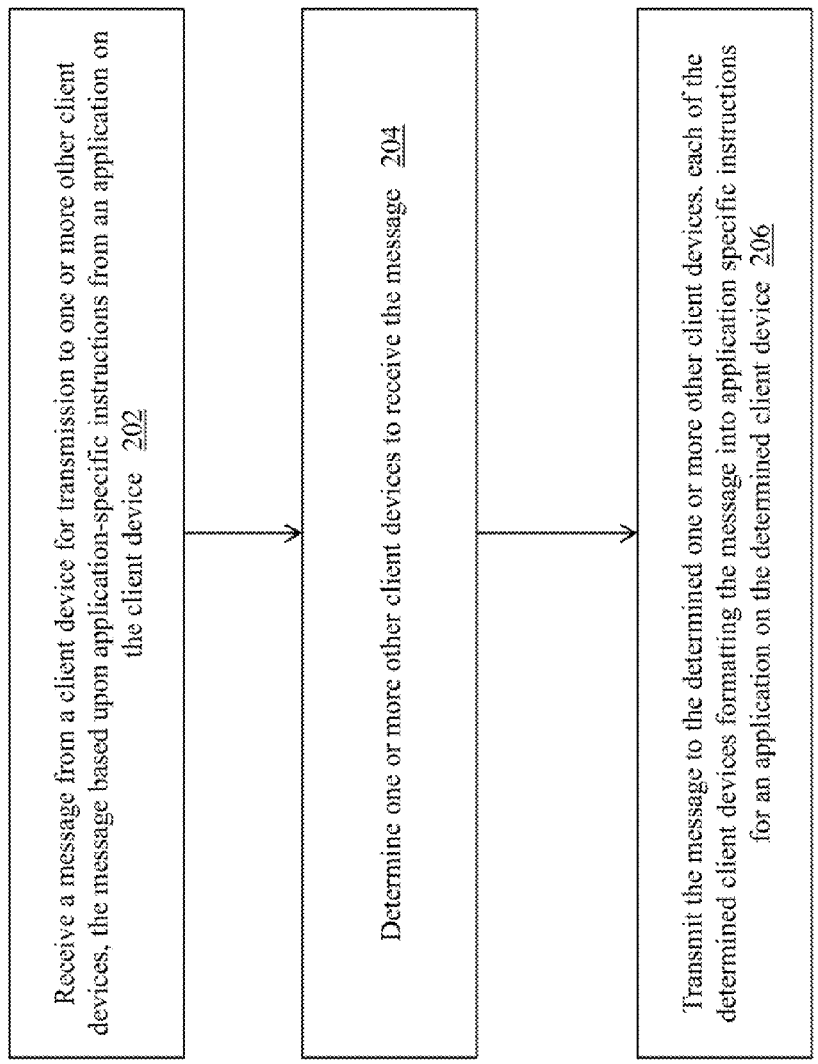
FIG. 2 is a flow diagram of a method for seamless interoperability between multiple computing devices.

FIG. 2 is a flow diagram of a method for seamless interoperability between multiple computing devices, using the system 100 of FIG. 1. The ensemble server computing device 102 receives (202) a message from a client device (e.g., client device 104a) for transmission to one or more other computing nodes in the ensemble (e.g., client devices 104b, 104c). The message generated by the client device 104a is based upon application-specific instructions from an application on the client device 104a. For example, the client device 104a can be an Android™-based smartphone and a camera application executing on the device 104a may want to transmit a photo to another device 104b (e.g., a smart television). The camera application formats instructions and other data that is specific to the camera application (e.g., photo files, metadata) into a form that is recognized and interpretable by the ensemble module 106a on device 104a. As an example, the camera application can interface with an API that is part of the camera application, and built to generate messages compatible with the ensemble server 102, to format the instructions and data.

After receiving the message, the ensemble server 102 determines (204) one or more other client devices (e.g., device 104b) to receive the message. As set forth above, although FIG. 1 depicts a plurality of client devices 104a-104c, it should be appreciated that the client devices 104a-104c of the system 100 can be any of a broad array of devices and nodes, include software-based applications (e.g., web services, cloud services, firmware on devices).

The ensemble server 102 transmits (206) the message to the determined one or more other client devices (e.g., device 104b), and each of the determined client devices formats the message into application-specific instructions for an application on the determined node. Continuing with the above example, the ensemble module 106b on the receiving device 104b (e.g., smart television) receives the message from the ensemble server and transmits the message to a photo-viewing application resident on the television. The photo-viewing application formats the message into instructions that are specific to the photo-viewing application and displays the photo on screen. In this manner, the sending device 104a and receiving device 104b need not be equipped with similar photo software, operating systems, and the like, and the photo itself does not have to be in a common format (e.g., .jpg, .gif) that each device 104a, 104b is capable of interpreting and rendering.

Figure 3:
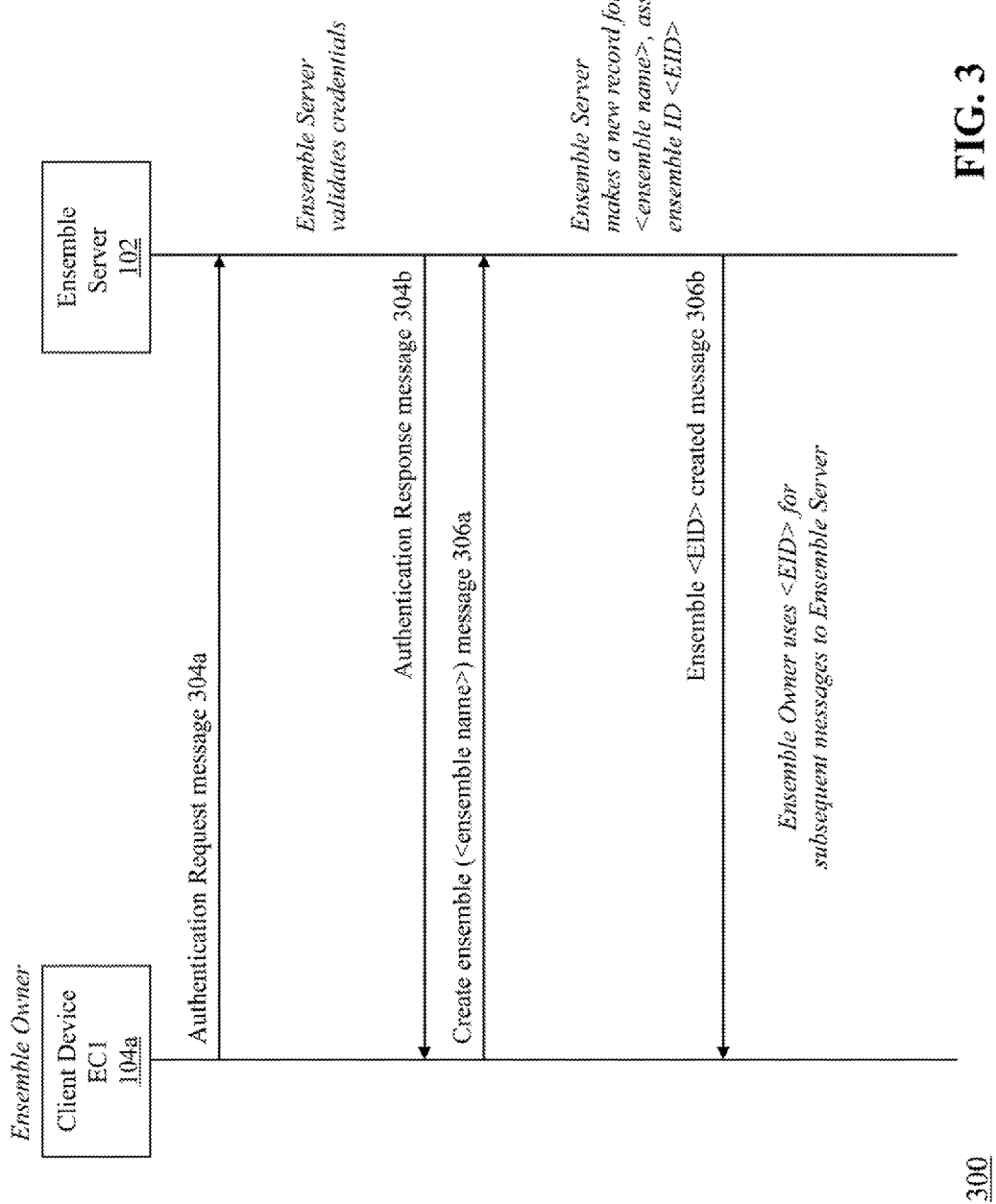
FIG. 3 is a flow diagram of a method for creating an ensemble computing system.

FIG. 3 is a flow diagram of a method 300 for creating an ensemble using the system 100 of FIG. 1 and according to an illustrative embodiment of the invention. An ensemble owner can access the ensemble server 102 via a computing device (e.g., opening a web browser on client device EC1 104a and navigating to a URL associated with the ensemble server 102). The ensemble owner provides authentication credentials (e.g., username and password) to the client device 104a, and the device transmits (304a) an Authentication Request message to the ensemble server 102. The ensemble server 102 validates the provided credentials (e.g., by comparing the received credentials to a database 108 record associated with the ensemble owner) and returns (304b) an Authentication Response message to the client device 104a that indicates the ensemble owner has successfully logged in. The ensemble owner then transmits (306a) a Create Ensemble message to the ensemble server 102. The Create Ensemble message includes an ensemble name attribute (e.g., <ensemble name>). The ensemble server 102 creates a new database record for the ensemble and stores the <ensemble name> attribute in the database record. The ensemble server 102 also assigns an ensemble ID (e.g., <EID>) attribute to the ensemble. The ensemble server returns (306b) an Ensemble Created message to the device 104a that includes the <EID> attribute for future reference by the device 104a. Therefore, subsequent ensemble messages sent to ensemble server 102 by client device 104a include the <EID> so that the server 102 can determine how to route the ensemble messages.

Figure 4:
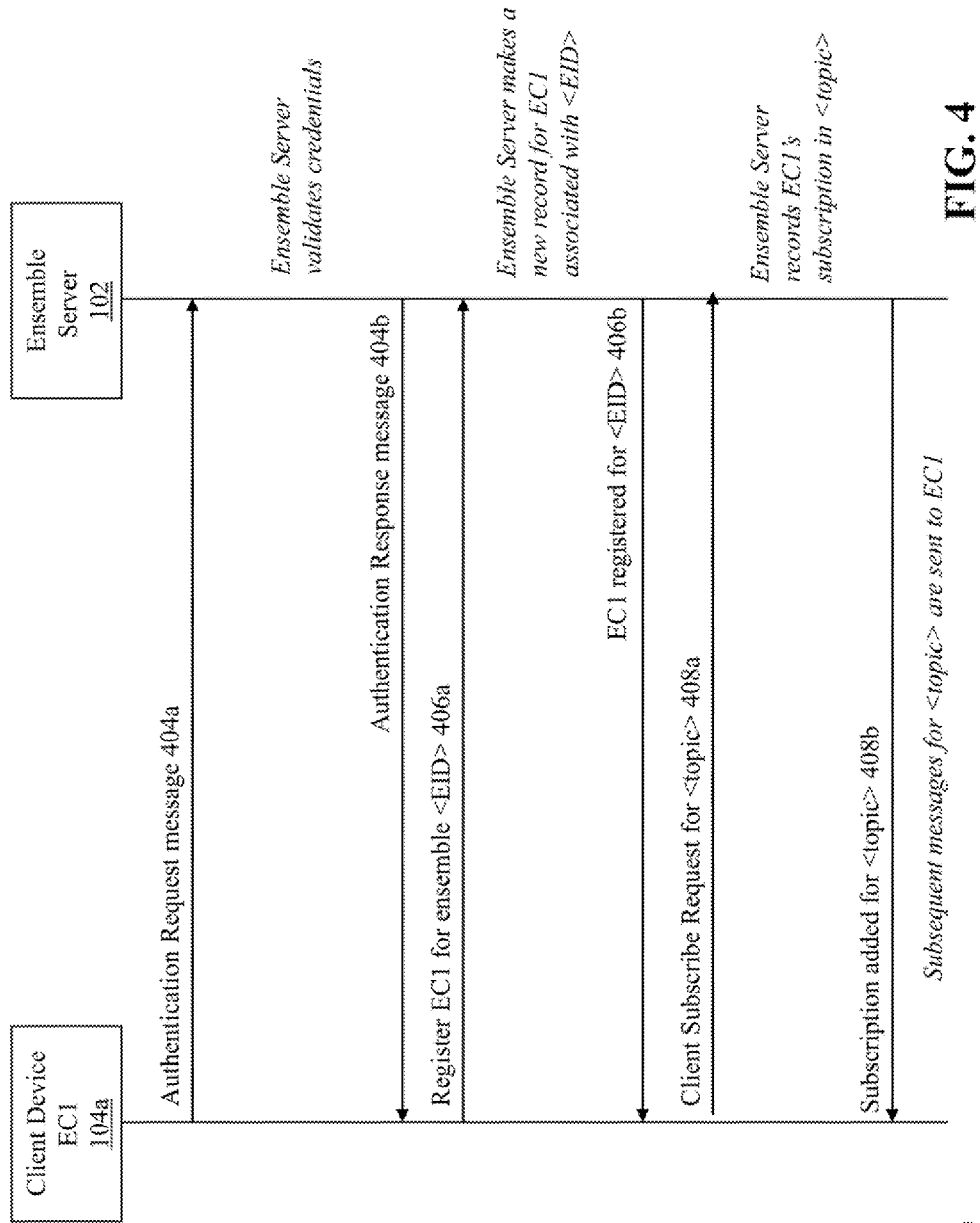
FIG. 4 is a flow diagram of a method for registering a node with an ensemble computing system.

FIG. 4 is a flow diagram of a method 400 for registering a node with an ensemble, using the system 100 of FIG. 1 and according to an illustrative embodiment of the invention. The client device EC1 104a transmits (404a) an Authentication Request message to the ensemble server 102, including authentication credentials to allow the client device EC1 104a to access the server 102. The ensemble server 102 validates the provided credentials and returns (404b) an Authentication Response message to the client device 104a. The device 104a then transmits (406a) a registration message to the ensemble server 102 including the <EID> for the ensemble that the device 104a wishes to join. The ensemble server 102 makes a new database record for client device EC1 104a associated with the <EID> ensemble (e.g., including information such as client device network address, client device identifier, client device name, client device owner name, and the like), and transmits (406b) a registration confirmation message to the client device EC1 104a indicating that the client device 104a is now registered as part of the <EID> ensemble. The client device EC1 104a then transmits (408a) a Client Subscribe Request message to the ensemble server 102 including a <topic> attribute. The ensemble server 102 records the client device EC1's subscription in the <topic> and transmits (408b) a subscription confirmation message to the client device EC1 104a indicating that the subscription is successfully configured. The ensemble server 102 then transmits subsequent messages associated with the <topic> to client devices (e.g., device EC1 104a) in the ensemble that are subscribed to the <topic>.

The <topic> attribute is used by the ensemble server 102 to identify different types of ensemble messages. In some embodiments, the <topic> attribute is a free-form, open-ended string that provides an indication of the type and/or content of the ensemble message. The list of <topic> attributes used by the ensemble system 100 can be determined by the developers of the respective applications that use the ensemble system 100 and Ensemble API. The ensemble server 102 does not interpret or understand the <topic> attribute for any specific ensemble messages. Instead, the ensemble server 102 records the <topic> attribute as part of a client device subscription and compares the <topic> attribute for incoming ensemble messages to determine whether a client device should receive the messages (i.e., if the client is subscribed to the <topic>).

FIG. 5 is a flow diagram of a method 500 for exchanging messages between devices in an ensemble, using the system 100 of FIG. 1 and according an illustrative embodiment of the invention. An application on client device EC1 104a wants to communicate a message for a particular topic (e.g., <topic>) to the other devices (e.g., client device EC2 104b, client device EC3 104c) in the ensemble. The client device EC1 104a transmits (504a) a message for <topic> to the ensemble server 102 including the <EID> for the ensemble. The ensemble server 102 looks up information for the other client devices (e.g., 104b, 104c) that are in the ensemble <EID> and subscribed to the <topic>. The ensemble server 102 then sends (504b) the message to client device EC2 104b and sends (504c) the message to client device EC3 104c.

As an example, client device EC1 104a can be a smart phone. A telephone call comes in to EC1 104a and the user wishes to transfer the call to his other devices EC2 104b (e.g., a PC running telephony software) and EC3 104c (e.g., a home phone connected to his wireless LAN) in the ensemble. The phone software on EC1 104a transmits a message for a topic associated with phone calls (e.g., <telephone call>) to the ensemble server 102. The ensemble server 102 determines that clients EC2 104b and EC3 104c are subscribed to the <telephone call> topic. The ensemble server 102 transmits the message to the EC2 and EC3 devices. At EC2 104b, the telephony software receives the ensemble message and converts the ensemble message into an application-specific format for receiving, e.g., an audio stream and corresponding SIP signaling for the call. At EC3 104c, the telephone firmware receives the ensemble message and converts the ensemble message into a specific format to enable the home phone to establish a call session. The user can then decide whether to answer the call on his PC (e.g., EC2) or his home phone (e.g., EC3).

Other example use cases for the ensemble system 100 and techniques described herein include, but are not limited to:

| Use case | Ensemble longevity | Ensemble members | Ensemble membership | Description |
| --- | --- | --- | --- | --- |
| Dial phone from a PC | Long term | All devices a user owns: smart phone, PC, tablet, gaming system, TV | Private | E.g., click on Fidelity's Active Trader Pro software notification of a company's earnings call and have a linked phone dial in to the call. |
| Send visual data from a PC to another screen for viewing/ manipulation | Long term | All devices a use owns: smart phone, PC, tablet, gaming system, TV | Private | Send a chart in Active Trader Pro to a tablet for more enhanced pinch/zoom capabilities. Send the chart to an HDTV to leverage larger display for insight/sharing. |
| Share Tweet with PC | Long term | All devices a user owns: smart phone, | Private | When consuming social media and news data on a tablet, send that trading |

| Use case | Ensemble longevity | Ensemble members | Ensemble membership | Description |
| --- | --- | --- | --- | --- |
| Broadcast to a team or group | Long term | PC, tablet, gaming system, TV IM systems of choice for my team | Shared/organizational | idea information to Active Trader Pro to take action. Extend IM to send data and actions instead of text messages. Examples include: Go to web site, workflow steps in a process, and the like. |
| Customer and rep | Duration of the call | Smart phone app of the customer, rep workstation | Shared, by invitation only | A customer's device joins a secure, private Ensemble with a rep for a shared guidance experience, collaborating with documents, data, screens, etc. Note this could be co-located in an Investor Center or remote with a home customer and a call center rep. |
| Two or more people exchanging information | Duration of the meeting | Two smart phones and scheduling services | Private, by invitation only | In a meeting or on-demand, join a temporary, shared Ensemble to collaborate and coordinate, then leave. For example, share navigation direction to a location. |
| Conference feedback gathering | Duration of the conference | Feedback gathering service and any device of a conference participant | Open, temporal | At a conference, attendees use their devices to join a common ensemble for group ideation, surveys, and two-way interactivity. |

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A system for seamless interoperability between multiple computing devices, the system comprising:
    a server computing device having a memory and a processor; and
    a plurality of computing devices coupled to the server computing device, wherein the plurality of computing devices is defined at the server computing device as a virtual network of nodes and each computing device includes a memory and a processor configured to execute an ensemble module for exchanging ensemble messages with the server computing device;
    the server computing device configured to:
        receive, from a first computing device not currently defined as a node in the virtual network, a request to join the virtual network, the request including authentication credentials and a virtual network identifier corresponding to the virtual network;
        validate the authentication credentials;
        define the first computing device as a node in the virtual network based upon the virtual network identifier;
        transmit, to the first computing device, the ensemble module for execution on the first computing device; and
        receive, from the first computing device, an ensemble message for transmission to one or more destination nodes in the virtual network,
        the ensemble message being generated by a first application on the first computing device that is coupled to the ensemble module on the first computing device via a first application-programming interface and the ensemble message containing application-specific instructions for the first application formatted to be interpretable by the ensemble module,
        the ensemble message being received by a second application at each of the destination nodes that is coupled to the ensemble module on the destination nodes via a second application-programming interface and the second application formatting the application-specific instructions for the first application into application-specific instructions for the second application,
        and wherein the ensemble message is agnostic to the first application and the second application.

2. The system of claim 1, wherein the first computing device transmits the request to join the virtual network to the server computing device based upon an invitation received from the server computing device.

3. The system of claim 2, wherein the invitation is received from one of the plurality of computing devices in the virtual network.

4. The system of claim 1, wherein the first computing device is removed from the virtual network after a predetermined period of time.

5. The system of claim 1, wherein the first computing device is removed from the virtual network upon request of one of the other computing devices in the virtual network.

6. A method for seamless interoperability between multiple computing devices, the method comprising:
- defining, by a server computing device having a memory and a processor, a virtual network comprising a plurality of computing devices coupled to the server computing device and each computing device including a memory and a processor configured to execute an ensemble module for exchanging ensemble messages with the server computing device;
- receiving, by the server computing device from a first computing device not currently in the virtual network, a request to join the virtual network, the request including authentication credentials and a virtual network identifier corresponding to the virtual network;
- validating, by the server computing device, the authentication credentials;
- assigning, by the server computing device, the first computing device to the virtual network based upon the virtual network identifier;
- transmitting, from the server computing device to the first computing device, the ensemble module for execution on the first computing device; and
- receiving, by the server computing device from the first computing device, an ensemble message for transmission to one or more destination nodes in the virtual network,
- the ensemble message being generated by a first application on the first computing device that is coupled to the ensemble module on the first computing device via a first application-programming interface and the ensemble message containing application-specific instructions for the first application formatted to be interpretable by the ensemble module,
- the ensemble message being received by a second application at each of the destination nodes that is coupled to the ensemble module on the destination nodes via a second application-programming interface and the second application formatting the application-specific instructions for the first application into application-specific instructions for the second application,
- and wherein the ensemble message is agnostic to the first application and the second application.

7. The method of claim 6, wherein the first computing device transmits the request to join the virtual network to the server computing device based upon an invitation received from the server computing device.

8. The method of claim 7, wherein the invitation is received from one of the plurality of computing devices in the virtual network.

9. The method of claim 6, wherein the first computing device is removed from the virtual network after a predetermined period of time.

10. The method of claim 6, wherein the first computing device is removed from the virtual network upon request of one of the other computing devices in the virtual network.

* * * * *